United States Patent [19]

Kelly et al.

[11] Patent Number: 4,910,513

[45] Date of Patent: Mar. 20, 1990

[54] APPARATUS AND METHODS FOR GENERATING A STALL WARNING MARGIN ON AN AIRCRAFT ATTITUDE INDICATOR DISPLAY

[75] Inventors: Brian D. Kelly, Redmond; James E. Veitengruber, Bellevue; Alan R. Mulally, Woodinville, all of Wash.

[73] Assignee: The Boeing Company, Seattle, Wash.

[21] Appl. No.: 240,864

[22] Filed: Sep. 6, 1988

Related U.S. Application Data

[63] Continuation of Ser. No. 119,694, Nov. 12, 1987, abandoned, which is a continuation of Ser. No. 800,057, Nov. 20, 1985, abandoned.

[51] Int. Cl.$^4$ .................................... G08B 23/00
[52] U.S. Cl. ............................... 340/966; 340/974; 340/975; 364/435
[58] Field of Search ............... 340/963, 971, 966, 967, 340/968, 974, 975, 977; 73/178 R, 178 T, 180; 364/427, 433, 434, 435; 33/328, 330; 244/1 R, 75 R, 181

[56] References Cited

U.S. PATENT DOCUMENTS

| Re. 31,159 | 2/1983 | Sicre | 364/427 |
|---|---|---|---|
| 2,941,400 | 6/1960 | Nesbitt | 340/973 |
| 3,686,626 | 8/1972 | Bateman et al. | 340/971 |
| 3,686,936 | 8/1972 | Daudt, Jr. | 340/966 |
| 3,822,047 | 7/1974 | Schuldt, Jr. | 364/427 |
| 3,970,829 | 7/1976 | Melvin | 73/178 R |
| 4,044,975 | 8/1977 | Blechen et al. | 340/974 |
| 4,121,246 | 10/1978 | Fadden et al. | 340/971 |
| 4,247,843 | 1/1981 | Miller et al. | 340/973 |
| 4,593,285 | 6/1986 | Miller et al. | 340/967 |
| 4,786,905 | 11/1988 | Muller | 340/975 |

Primary Examiner—Joseph A. Orsino
Assistant Examiner—Brent A. Swarthout
Attorney, Agent, or Firm—Robert H. Sproule; B. A. Donahue

[57] ABSTRACT

A pitch limit symbol is generated at an aircraft attitude indicator which provides a pilot with display of a stall warning angle of attack margin which is referenced to an airplane symbol on the primary attitude indicator. The position of the pitch limit symbol relative to the aircraft symbol is a function of the difference in angle of attack between the current angle of attack at the aircraft, and a predetermined angle of attack at which the onset of stall warning occurs. Additional information is provided on the attitude indicator by a flight path angle symbol. The pitch limit symbol together with the flight path angle symbol provides the pilot with information to achieve a positive rate of climb during a pitch up maneuver while adjusting the pitch attitude of the aircraft to avoid a stall situation. The position of the pitch limit symbol may be compensated by various means to decrease the distance between the aircraft symbol and the pitch limit symbol.

6 Claims, 4 Drawing Sheets

APPARATUS AND METHODS FOR GENERATING A STALL WARNING MARGIN ON AN AIRCRAFT ATTITUDE INDICATOR DISPLAY

This is a continuation of application Ser. No. 119,694 filed Nov. 12, 1987 now abandoned, which is a continuation of application Ser. No. 800,057 filed Nov. 20, 1985 now abandoned.

TECHNICAL FIELD

The present invention relates to apparatus and methods for generating a visual display of aircraft operating flight limitations, and more particularly to a visual display which provides information of aircraft stall warning margin in relation to an indication of aircraft attitude and in conjunction with an indication of flight path angle.

BACKGROUND OF THE INVENTION

Presently, there are several methods for indicating an impending aircraft stall situation. One method utilizes a computed stall warning airspeed which is identified by a symbol at a corresponding location on an airspeed indicator.

Another method of indicating a stall condition of an aircraft is the utilization of an angle of attack indicator which can be located in the aircraft cockpit, and which provides a direct indication of the aircraft flight situation in relation to a stall condition. An angle of attack indicator uses an indicating scale which may be scaled in arbitrary units. A pivotal vane typically located on the outside of the aircraft senses the current angle of attack of the airflow along the aircraft, and feeds the information, after proper scaling, to an angle of attack indicator. The stall angle of attack is sometimes indicated by a symbol on the angle of attack scale.

Warning devices such as stick shaker and stallhorns are also utilized to warn of an impending stall condition. These devices are typically actuated prior to the aircraft entering stall buffet in order to give the aircrew advanced warning of an impending stall condition. In the case of a stick shaker, when the aircraft first reaches the predetermined stall warning limit, a motor is activated which causes the aircraft control stick to begin vibrating rapidly providing the aircrew with a tactile warning of an impending stall condition.

No indications are currently known to exist which allow the pilot to effectively accomplish a pitch up maneuver without exceeding the maximum allowable angle of attack. Current stall warning devices, such as stick shakers, present no information during a pitch up maneuver until the selected angle of attack threshold is exceeded. Angle of attack indicators have technical potential in this regard, but are not operationally practical for use in a marginal performance situation near the ground. This is because an angle of attack indication is rarely used in commercial transport airplanes during normal operations. Its use by the pilot would therefore be unlikely in the rare situation when a maximum lift capability maneuver is required. To fly out of such high stress situations, the pilot will normally rely on instruments that he is accustomed to using in routine situations.

Displaying a computed stall warning airspeed, or any other airspeed based on stall, on the airspeed instrument is another means by which the maximum allowable lift capability could theoretically be used by the pilot. However, this concept has the following disadvantages, namely (1) stall speed varies as the square of load factor which causes stall speed to change rapidly during pitch maneuvers making it a difficult parameter to control or to avoid, and (2) a pilot cannot control speed directly; only acceleration and deceleration can be controlled directly by varying pitch attitude and thrust.

A stall warning device is disclosed in U.S. Pat. No. 3,686,936—by Daudt, Jr. The instrument includes a first scale calibrated in degrees of angle of attack together with corresponding pointer which points to a location on the scale to indicate the current angle of attack of the aircraft. A second Mach number scale located adjacent to the angle of attack scale indicates the Mach number corresponding to the angle of attack at which stall buffet will begin.

In Lear, U.S. Pat. No. 2,942,233, there is disclosed an instrument for indicating the pitch attitude of an aircraft, and the relationship of aircraft position to a radio beam defining a selected glide slope.

In U.S. Pat. No. Re. 31,159 by Sicre, there is disclosed an aircraft instrument for guiding the aircrew during takeoff and landing approach go-around. The instrument includes a horizontal bar which is displaced relative to an aircraft symbol at a distance which is a function of a generated error signal representative of the difference between an aerodynamic flight path angle and a desired flight path angle.

SUMMARY OF THE INVENTION

The embodiments of the present invention described more fully hereinafter pertain to apparatus and methods for displaying symbols on an aircraft attitude indicator to provide the aircrew with a continuous visual indication of aircraft attitude and the relationship of the current aircraft angle of attack to that angle of attack where onset of stall warning occurs. The attitude indicator includes a symbolic presentation of the position of the aircraft along pitch and roll axes relative to the horizon. Incremental pitch scale lines are also displayed which define the orientation of the aircraft in degrees of upward or downward pitch attitude. The attitude indicator, in association with the present invention, includes a pitch limit symbol which is located above the aircraft symbol a distance which is a function of a calculated margin between the current angle of attack of the aircraft, and that angle of attack which causes onset of stall warning. The pitch limit symbol provides the pilot with a visual indication of the margin to the onset of stall warning in relation to aircraft pitch attitude. During maneuvers requiring pitch attitude control in a flight region near stall warning, the pilot by observing the primary attitude indicator, can observe the pitch attitude of the aircraft in relation to a visual margin between current aircraft angle of attack and angle of attack at which onset of stall warning occurs. Therefore, in a situation such as low altitude windshear where it may be desirable to obtain maximum amount of lift, the aircraft pilot by observing the integrated display of the present invention, is provided with information of stall warning margin in relation to aircraft pitch attitude. This allows the pilot to control the aircraft in a manner to obtain, if necessary, a maximum amount of aircraft lift during a pitch up maneuver while maintaining an appropriate margin to stall.

In an exemplary embodiment, a flight path angle symbol is also displayed on the primary attitude indicator which represents the current flight path of the aircraft in relation to a horizon symbol. Typically, in situations requiring large pitch up maneuvers, a primary purpose is to obtain a positive rate of aircraft climb. Therefore, by observing the location of the aircraft symbol in relation to the pitch limit symbol and the location of the flight path angle symbol in relation to the horizon, the aircrew is provided with visual feedback for controlling aircraft pitch attitude in a manner to obtain a positive rate of climb while avoiding the onset of stall warning.

In another embodiment, the distance between the pitch limit symbol and the airplane symbol is reduced by a computed compensation factor when two concurrent flight conditions occur, namely when (1) airspeed rate is calculated to be a negative amount thereby indicating decreasing aircraft airspeed, and (2) the pitch attitude of the aircraft is greater than a predetermined maximum expected pitch attitude. This is one method for reducing the distance between the pitch limit symbol and the airplane symbol, and other methods will be discussed in the Detailed Description.

It is therefore an object of the present invention to provide apparatus and methods for generating information related to aircraft attitude to aid in operating an aircraft within a recommended operational envelope.

BRIEF DESCRIPTION OF THE DRAWINGS

These and other objects and advantages of the present invention will become more readily apparent upon reading the following detailed description and upon reference to the attached drawings in which.

Figure 1:
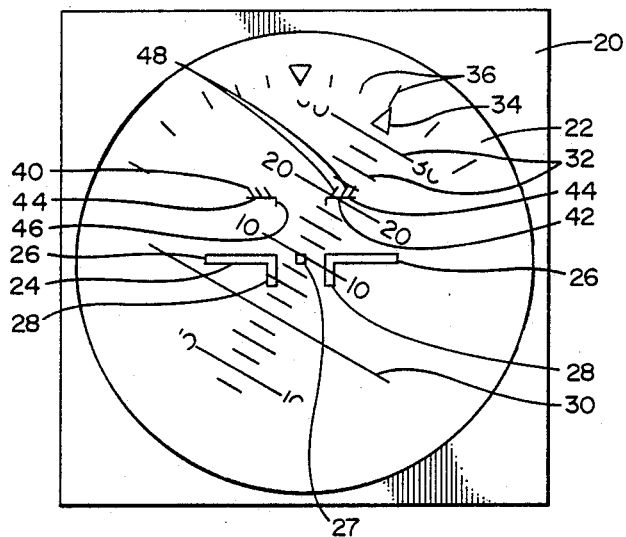
FIG. 1 is a representation of an aircraft primary attitude indicator including symbols representing the aircraft, the earth's horizon, degrees of aircraft pitch above and below the earth's horizon, degrees of aircraft roll, and a pitch limit indicating margin between current aircraft angle of attack and stall warning angle of attack.

While the present invention is susceptible to various modifications and alternate forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention.

DETAILED DESCRIPTION OF THE INVENTION

A stall situation may be encountered by an aircraft in an emergency in which the aircraft has entered high angle of attack condition. To maintain control of the aircraft, the aircrew must diagnose the nature of the emergency and make aircraft attitude corrections rapidly and accurately in accordance with their diagnosis. In such a situation, however, it is generally a tendency of the aircrew to rely on those flight instruments which are used under normal conditions by the aircrew in operating the aircraft. Typically an instrument often utilized when operating the aircraft is a primary attitude indicator which provides a symbolic representation of aircraft orientation along pitch and roll axes relative to the horizon. The primary attitude indicator is particularly useful when the earth's horizon cannot be seen, such as when the aircraft is flying in reduced visibility, or when the aircraft is operating at a nose high attitude, e.g., during takeoff.

Presently, in larger commercial aircraft, stall warning devices are commonly provided in the cockpit to warn the aircrew of an impending stall condition. These warnings may take the form of an audio signal, a discrete "on/off" visual signal, or in the form of a mechanical stick shaker which vibrates the aircraft control column rapidly to provide a tactile indication of impending stall through the pilot's hands and arms. The present invention provides a visual indication superimposed on the primary attitude indicator of a margin between current aircraft angle of attack and angle of attack at onset of stall warning, and hereinafter referred to as the angle of attack margin. This margin is visually displayed by the location of a pitch limit symbol relative to the airplane symbol on a conventional aircraft attitude indicator.

Referring to FIG. 1, a preferred embodiment of the present invention is shown in which a pitch limit symbol 40 is displayed on an attitude indicator 20. In order to better understand the present invention and the relationship of pitch limit symbol 40 to the attitude indicator 20, a conventional attitude indicator is described in further detail. The attitude display is generated on a cathode ray tube (CRT) screen 22 located in the cockpit of the aircraft. The display includes an airplane symbol 24 having a pair of spaced apart left and right horizontal components 26, and vertical components 28 projecting vertically downward at an inner end of each horizontal component 26. A center marker 27 is located between horizontal components 26 and longitudinally aligned therewith to represent the longitudinal centerline of the aircraft. Together with airplane symbol 24, the display provides aircraft pitch and roll attitude information in conjunction with a line 30 representing the location of the earth's horizon relative to airplane symbol 24. A plurality of lines 32 located in a parallel manner above and below horizon line 30 represent the degrees of pitch attitude of the aircraft above or below the horizon. Pitch lines 32 display a current pitch attitude of the aircraft when center marker 27 is aligned with the corresponding pitch line 32. To display aircraft roll information, horizon line 30 and pitch lines 32 rotate in the plane of FIG. 1 thereby producing an indication of pitch and roll attitude relative to the aircraft symbol 24. A roll pointer symbol 34 indicates the number of degrees of aircraft bank at dial indices 36 located about the upper perimeter of the display. It is to be understood that the aforementioned elements of the conventional attitude indicator are known in the art. They are described herein to provide an understanding of the unique manner in which the limit display of the present invention operates in conjunction with the aforementioned elements of the attitude indicator to define an aircraft operating margin.

In accordance with the present invention, a visual indication of the relationship of the aircraft attitude to the onset of stall warning is provided by pitch limit symbol 40. Pitch limit symbol 40 has a configuration somewhat similar to airplane symbol 24 so that it is clear to the pilot that the pitch limit symbol 40 and the airplane symbol 24 are related. Specifically, pitch limit symbol 40 includes a left linear horizontal component 44 which is located above and parallel to the left horizontal component 26 of aircraft symbol 24, and a right linear horizontal component 44 which is located above and parallel to the right horizontal component 26 of aircraft symbol 24. The horizontal components 44 include respective vertical components 46 which project vertically downward from the respective inner ends of the horizontal components 44 and which vertically align with inner vertical surfaces of vertical components 28. A plurality of diagonal lines 48 project upward from horizontal components 44. The location on the pitch limit symbol 40 which corresponds to the limit is clearly established by the shape of all the components of the pitch limit symbol 40. Specifically, the horizontal component 44 defines a definite lower border, while the diagonal lines 48 define an indeterminate upper border. This makes it clear to the pilot that the pitch limit symbol 40 has only one location corresponding to one limit, and that all locations above the horizontal component 44 are beyond the limit.

In operation, as the aircraft pitches up, horizon line 30 and pitch lines 32 move downward relative to the center of the airplane symbol 24. As the aircraft rolls, horizon line 30 and pitch lines 32 rotate about a center of the airplane symbol 124. The parallel orientation of pitch limit symbol 40 relative to aircraft symbol 24 remains the same, however a distance y (FIG. 2) between the top surfaces of horizontal components 26, and the bottom surfaces of horizontal components 44, varies in order to reflect the angle of attack margin relative to stall warning. Thus, as the angle of attack of the aircraft begins to increase for any reason, the distance y decreases indicating the approach of the aircraft to the onset of stall warning. By observing the attitude indicator, the aircrew is aware simultaneously of the attitude of the aircraft and the angle of attack margin to stall warning. This visual feedback allows the aircrew to control the aircraft near stall warning while maintaining the aircraft in an operational flight envelope.

In the present invention, the pitch limit varies linearly with load factor making it less sensitive to pitch excursions than stall warning speed. In addition, pitch attitude can be controlled directly by the pilot. Therefore, presentation of the pitch limit on the attitude indicator generates a familiar indication to the pilot, and its use will be likely, even in high stress situations. Pitching the airplane up while avoiding stall warning will therefore be easier and more quickly accomplished using the computed pitch limit indication than it would be if either stall warning speed or pure angle of attack were the indicated parameters.

Figure 2:
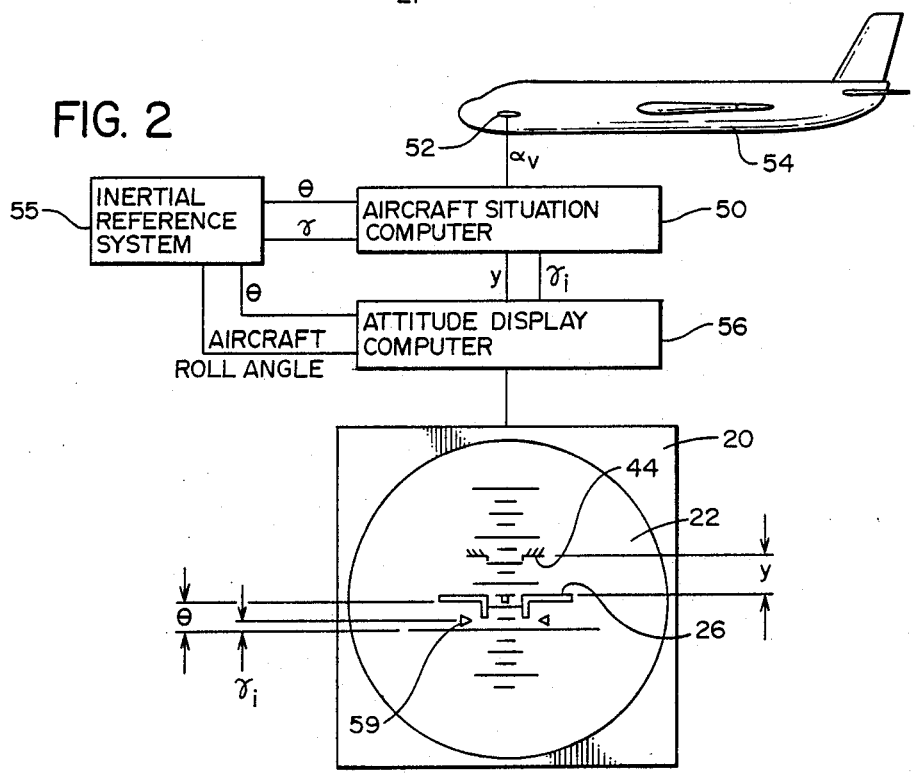
FIG. 2 is a schematical representation of the components of the present invention.

In order to position the pitch limit symbol 40 relative to aircraft symbol 24 to indicate the margin to stall warning onset, the present invention includes an aircraft situation computer 50 shown in FIG. 2, which receives sensed signal inputs from an angle of attack sensor having a movable vane 52 connected to an exterior location of an aircraft 54. Movable vane 52 is a small airfoil which pivots relative to the incoming airflow to measure the angle of attack of the airflow relative to the aircraft 54. As will be discussed in more detail later, a digital computer 50 stores the functional algorithms utilized in performing the necessary calculations to locate the position of pitch limit symbol 40 with respect to airplane symbol 24 as well as other flight condition displays to be described hereinafter. An inertial reference system 55 provides inputs of pitch attitude $\theta$ and inertial flight path angle $\gamma$ to the aircraft situation computer 50. Pitch and roll attitude information is fed from the inertial reference system 55 to an attitude display computer 56. Attitude display computer 56 is interfaced between the computer 50 and the primary attitude indicator 20 to generate the necessary symbols in response to inputs from inertial reference system 55 and computer 56 to create the visual display at CRT screen 22 described previously.

Figure 3:
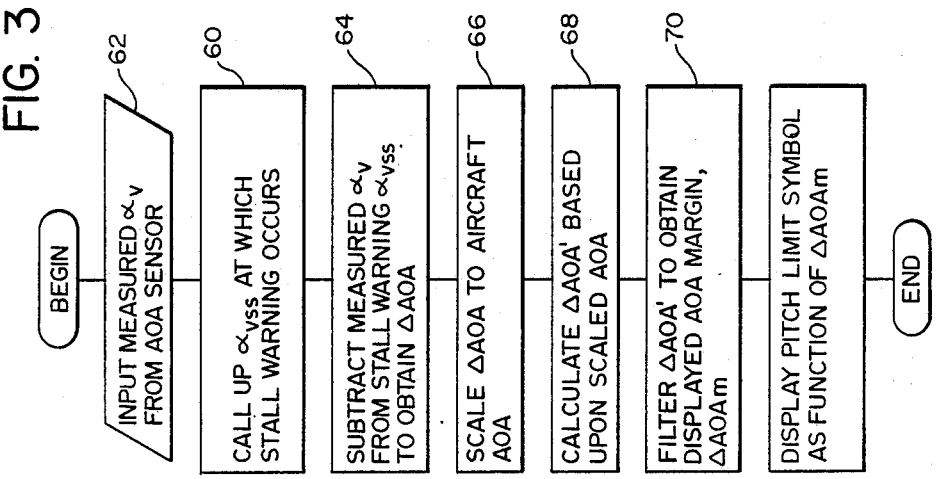
FIG. 3 is a flow chart for determining an angle of attack margin between the current aircraft angle of attack and the angle of attack at which stall warning occurs to position the pitch limit symbol relative to the aircraft symbol on the display.

Positioning of pitch limit symbol 40 relative to aircraft symbol 24 is accomplished in accordance with the functional steps shown in FIG. 3 which are stored in the memory of computer 50. A vane angle of attack $\alpha_{vss}$, which represents an angle of attack at which the onset of stall warning is scheduled to occur for various airplane configurations or other parameters, is programmed into the memory of computer 50 at flow block 60. Measured values of current aircraft vane angle of attack $\alpha_v$ which are obtained from the angle of attack indicator 52 at flow block 62, are subtracted from the stored values of $\alpha_{vss}$ to generate an angle of attack differential ($\Delta AOA$) at flow block 64. $\Delta AOA$ represents the difference between the angle of attack of airflow at vane 52, and the vane angle of attack at the onset of stall warning. The angle of attack measured at vane 52 may vary in a known manner from the angle of attack of airflow at aircraft 54 due to the shape or other characteristics of the airplane, as well as the location of sensor 52. This relationship is stored in memory and used to scale the calculated $\Delta AOA$ at flow block 66 to generate a scaled angle of attack differential $\Delta AOA'$ at flow block 68. Furthermore, to eliminate distractive transient signals such as when the aircraft 54 enters turbulence, the calculated angle of attack differential $\Delta AOA'$ is filtered at block 70 in accordance with a filtering term $1/(\tau s + 1)$ where $\tau$ is the time constant of the filter. The resulting value, $\Delta AOA_m$, represents the distance between the lower edge of pitch limit symbol 40 and the upper edge of the airplane symbol 24, and is displayed at CRT screen 24 in the same scaling (degrees/inch) as pitch attitude.

Figure 4:
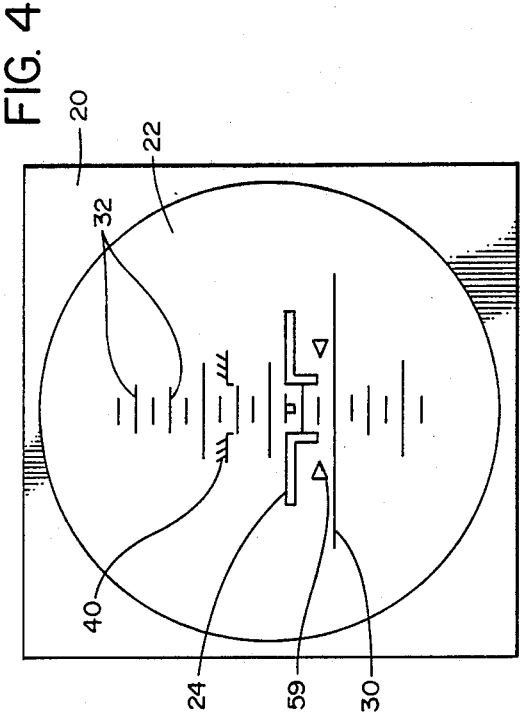
FIG. 4 is a representation of an exemplary embodiment of the display including flight path angle and pitch limit symbols.
Figure 5:
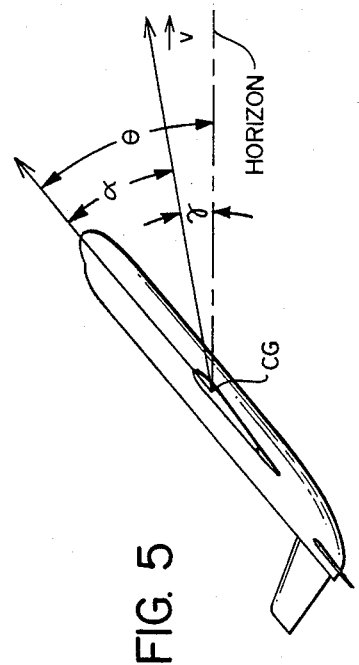
FIG. 5 is a diagrammatic representation of aircraft pitch attitude in relation to the horizon illustrating flight path angle $\gamma$, pitch attitude $\theta$, and airplane angle of attack $\alpha$.

In association with the pitch limit symbol 40 at CRT screen 22, it is useful to provide a visual indication to the pilot whether the aircraft is achieving a positive or negative flight path angle. In an exemplary embodiment of the present invention, the display at CRT screen 22 includes flight path angle symbol 59 shown in FIG. 4. Flight path angle symbol 59 is defined by a pair of triangles which are positioned above horizon line 30 when indicating a positive flight path angle, i.e. aircraft climb flight path, and positioned below horizon line 30 when indicating a negative flight path angle, i.e. an aircraft descent flight path. The relationship of flight path angle γ to angle of attack α and aircraft pitch attitude θ is shown in FIG. 5 for a non-moving airmass wherein flight path angle γ is an angle formed by the intersection of the earth's horizon and a vector $\vec{V}$ representing the velocity of the aircraft through the aircraft's center of gravity. Angle of attack α is defined as that angle formed by the intersection of velocity vector $\vec{V}$ and the pitch attitude θ of the aircraft.

Figure 6:
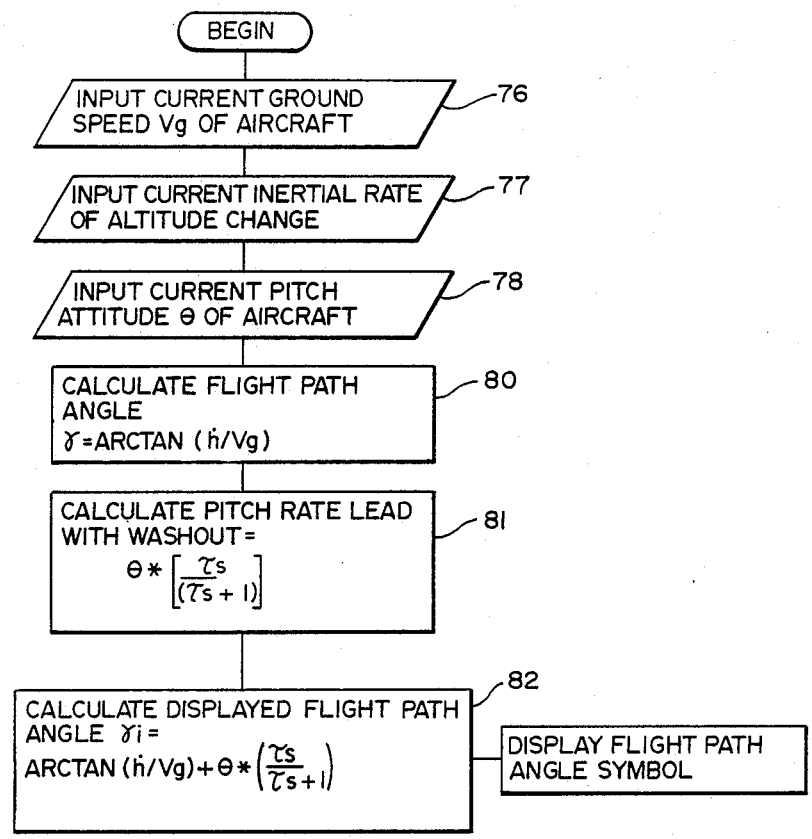
FIG. 6 is a flow chart disclosing the functional steps for calculating flight path angle in order to display the flight path angle symbol relative to the horizon symbol.

The display of flight path angle symbol 59 is generated in accordance with the functional steps disclosed in the flow chart in FIG. 6. Initially inputs are made at flow blocks 76 through 78 of aircraft ground speed ($V_g$) which is retrieved from an inertial reference computer onboard aircraft 54, as well as (1) a change of aircraft altitude as a function of time, (inertial altitude rate, h.=dh/dt), and (2) current aircraft pitch attitude θ. Flight path angle γ is then calculated at block 80 by the known relationship γ=arctan (h./$V_g$). Due to an inherent lag between a pitch change and a resultant flight path angle change, generation of displayed flight path angle symbol 59 includes a pitch rate lead term which in LaPlace notation is defined at block 81 as $\theta[\tau s/(\tau s+1)]$. The resulting displayed flight path angle equation at block 82 is $$\gamma i = \arctan(h./Vg) = \theta[\tau s/(\tau s+1)].$$

The combination of pitch limit symbol 40 and inertial flight path angle symbol 59 provide information to the pilot at attitude indicator 20 to enable the aircraft to be controlled in those situations, e.g., wind shear at low altitude, where large pitch changes to achieve a maximum amount of lift may be necessary to avoid ground contact. In the event of such a situation, the aircraft pitch attitude is adjusted in an upward direction. As the aircraft responds to the pitch command and the angle of attack differential ΔAOA' decreases, the distance between the pitch limit symbol 40 and the aircraft symbol 24 begins to decrease (FIG. 1). In association with the increase in pitch attitude observed on the primary attitude indicator 20, the aircrew, by observing the flight path angle symbol 59, can determine when a positive flight path of aircraft 54 is achieved. The flight of the aircraft 54 therefore is controlled in a manner by observing (i) the position of aircraft symbol 24 relative to horizon line 30 and pitch lines 32, (ii) the position of aircraft symbol 24 relative to pitch limit symbol 40, and (iii) the position of flight path angle symbol 59 relative to horizon symbol 30. This allows the pilot to achieve a positive flight path while avoiding the onset of stall warning. It is a unique feature of the present invention that the angle of attack margin and attitude information is present on a single instrument in the aircraft cockpit, and that the margin is displayed relative to the attitude indicator. In this way, the pitch limit display is directly related to the pilot's control task, i.e. controlling aircraft attitude.

Figure 7:
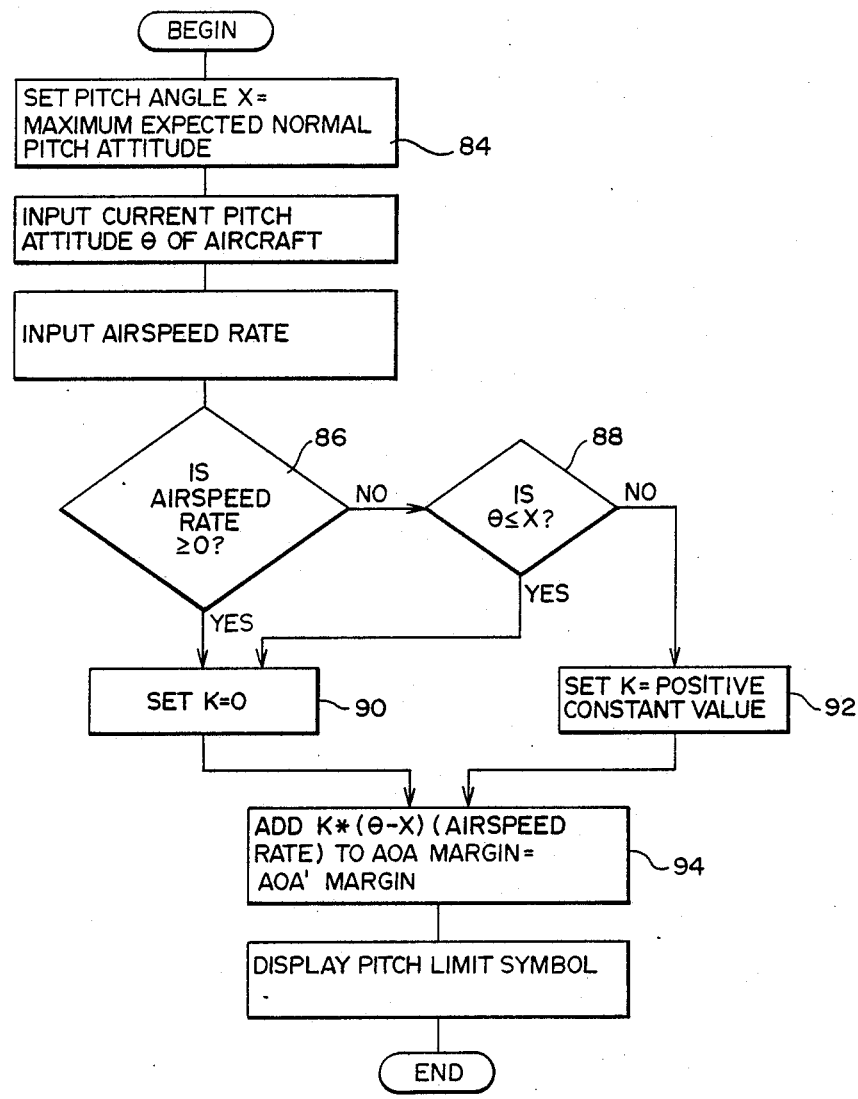
FIG. 7 is a flow chart disclosing one method of compensating the calculated angle of attack margin in order to reduce the vertical distance between the pitch limit symbol and the airplane symbol during certain aircraft flight conditions.

In another embodiment of the present invention the angle of attack margin $\Delta AOA_m$ is reduced by a predetermined amount by adding an additional compensating term to the calculated angle of attack margin $\Delta AOA_m$ to generate $\Delta AOA'_m$. Thus, $\Delta AOA_m$, which is a function of the difference between aircraft angle of attack and stall warning onset angle of attack, is greater than a displayed angle of attack margin corresponding to the distance between the pitch limit symbol 40 and the aircraft symbol 24. The resulting display may be used to discourage operation of the aircraft at inappropriate or abnormal pitch attitudes. Compensation is achieved by reducing $\Delta AOA_m$ an amount, $k(\theta-x) * (\dot{V}_{ac})$, where $\dot{V}_{ac}$ = aircraft airspeed rate (true airspeed rate, calibrated airspeed rate or indicated airspeed rate), x is a maximum expected normal pitch attitude, and k = a constant when θ>x and $\dot{V}_{ac}$ is negative; otherwise k=0 when θ<x, or when $\dot{V}_{ac}$ is positive. This compensating term has the effect of decreasing the distance between the pitch limit symbol 40 and aircraft symbol 24 in the event that both (1) airspeed rate is negative, and (2) the pitch attitude of the aircraft exceeds a predetermined pitch attitude. This is achieved in accordance with the flow chart in FIG. 7 by initially determining a maximum expected normal pitch attitude x at flow block 84. Preferably, maximum expected normal pitch attitude is equivalent to a pitch attitude which corresponds to the recommended takeoff pitch attitude of the aircraft at a minimum gross weight, and which is indicative of the maximum pitch attitude which would be likely encountered in normal aircraft operations. If airspeed rate is found to be greater than or equal to zero at decision block 86, or if the current pitch attitude θ is found to be less than the maximum normal pitch attitude x at decision block 88, then k is set equal to zero at block 90 and the compensating term has no effect. On the other hand, if airspeed rate is a negative value indicating an aircraft flight condition where airspeed is decreasing, and if the actual pitch attitude of the aircraft is greater than x, then k is set equal to a predetermined constant value at block 92. At block 94 the constant k is multiplied by the amount that the current pitch attitude of the aircraft exceeds the expected pitch attitude, the resulting product is multiplied by airspeed rate and this product is added to $\Delta AOA_m$. This has the effect of reducing $\Delta AOA_m$ by an amount proportional to the airspeed rate, if negative, and by the amount which the pitch attitude exceeds the maximum normal pitch attitude.

The distance between aircraft symbol 24 and pitch limit symbol 40 also may be reduced by a linear compensation term $k(\theta-x)$, or a nonlinear compensation term $k(\theta-x)^2$, where k, θ and x are values defined previously, and similar logic is used to set k=0 or k equal to a constant.

Instead of the aforementioned compensation terms, logic may be incorporated into the pitch limit calculation which causes the pitch limit never to be displayed higher than a predetermined pitch attitude. In other words, the distance between limit symbol 40 and the airplane symbol 24 is never allowed to exceed the difference between the aforementioned predetermined pitch attitude and the current aircraft pitch attitude. In this case, the pilot may be instructed that the pitch limit symbol indicates margin to stall warning, but it also may indicate a maximum allowable pitch attitude regardless of margin to stall warning.

What is claimed is:

1. In an aircraft information display apparatus including an attitude display indicator having (i) a first aircraft symbol and a second horizon symbol, which are positioned at relative locations to each other to indicate an aircraft flight attitude, and (ii) a third symbol, apparatus for displaying an aircraft stall warning margin comprising:

a. sensor means for measuring a current angle of attack of the aircraft, and for providing a first output thereof;

b. computing means for storing an angle of attack at which a stall warning of the aircraft occurs, and for calculating, in response to the first output, an angle of attack difference between the current angle of attack and the stall warning angle of attack;

c. control means for positioning the third symbol above the first aircraft symbol so that a displayed distance between the third symbol and the first aircraft symbol, which is representative of the stall warning margin, is a function of the angle of attack difference; and d. the computing means operating in a manner to reduce the angle of attack difference by a selected amount when an airspeed rate of the aircraft is negative and a pitch attitude of the aircraft exceeds a predetermined pitch attitude, so that the displayed difference between the third symbol and the first airplane symbol is reduced by an amount which represents a safety margin.

2. An informational display apparatus for displaying an aircraft stall warning margin, comprising:

a. informational display means for displaying (i) a first aircraft symbol and a second horizon symbol at relative locations to each other to indicate an aircraft flight attitude, and (ii) a third margin symbol relative to the aircraft symbol to display the stall warning margin which is represented by a distance between the third symbol and the aircraft symbol;

b. sensor means for determining a current angle of attack of the aircraft;

c. computing means for storing an angle of attack at which a stall warning of the aircraft occurs, and for calculating an angle of attack difference between the current angle of attack and the stall warning angle of attack;

d. control means for positioning the third symbol relative to the first aircraft symbol so that a displayed distance between the third margin symbol and the first aircraft symbol is a function of the angle of attack difference; and e. the computing means operates in a manner to reduce the angle of attack difference by a selected amount when an airspeed rate of the aircraft is negative and a pitch attitude of the aircraft exceeds a predetermined pitch attitude, so that the displayed difference between the third margin symbol and the first airplane symbol is reduced to provide a safety margin.

3. The informational display apparatus as set forth in claim 2 wherein the angle of attack difference is reduced by an amount equal to $k(\theta - x) * V_{AC}$, where k equals a constant, $\theta$ equals aircraft current pitch attitude, x equals a predetermined pitch attitude, and $V_{AC}$ equals aircraft current airspeed rate.

4. The informational display apparatus as set forth in claim 2 wherein the angle of attack difference is reduced by an amount equal to $k(\theta - x)$, where k equals a constant, $\theta$ equals an aircraft current pitch attitude, and x equals an aircraft predetermined pitch attitude.

5. The informational display apparatus as set forth in claim 2 wherein the angle of attack difference is reduced by an amount equal to $k(\theta - x)^2$, where k equals a constant, $\theta$ equals an aircraft current pitch attitude, and x equals an aircraft predetermined pitch attitude.

6. The informational display apparatus as set forth in claim 2 wherein the computer means operates in a manner to reduce the displayed angle of attack difference by preventing a displayed distance between the third margin symbol and the first horizon symbol from exceeding a predetermined amount as the angle of attack difference increases.

* * * * *